United States Patent [19]

Jensen

[11] 3,933,564

[45] Jan. 20, 1976

[54] METHOD OF AFFIXING LABELS TO A WEB OF SHEET OR FILM MATERIAL AND APPARATUS FOR CARRYING OUT SAID METHOD

[75] Inventor: Ole Roger Jensen, Copenhagen N, Denmark

[73] Assignee: A/S Rolles Fabriker, Denmark

[22] Filed: Apr. 10, 1973

[21] Appl. No.: 349,814

[30] Foreign Application Priority Data

Aug. 22, 1972 Denmark ............................ 4155/72
Sept. 26, 1972 Denmark ............................ 4748/72

[52] U.S. Cl. ................ 156/265; 156/302; 156/519; 156/552; 156/580; 226/114

[51] Int. Cl.² ........................................... B32B 31/04

[58] Field of Search ........... 156/256, 285, 309, 494, 156/495, 496, 517, 518, 519, 541, 542, 552, 580, 520, 265, 302; 226/114; 282/11.5 A

[56] References Cited

UNITED STATES PATENTS

| | | | |
|---|---|---|---|
| 3,036,941 | 5/1962 | Sigmon | 156/542 |
| 3,102,673 | 9/1963 | Aronson et al. | 226/114 |
| 3,111,446 | 11/1963 | Flood | 156/542 |
| 3,113,904 | 12/1963 | Phipps | 156/542 |
| 3,159,521 | 12/1964 | Pechman | 156/519 |
| 3,162,116 | 12/1964 | Weber | 282/11.5 A |
| 3,434,724 | 3/1969 | Palmer | 226/114 |
| 3,454,447 | 7/1969 | Corbett et al. | 156/495 |
| 3,657,054 | 4/1972 | Warsager | 156/542 |
| 3,707,422 | 12/1972 | Helm | 156/520 |
| 3,758,367 | 9/1973 | Berg | 156/552 |
| 3,820,447 | 6/1974 | Gendron et al. | 282/11.5 A |

*Primary Examiner*—Douglas J. Drummond
*Assistant Examiner*—Basil J. Lewris
*Attorney, Agent, or Firm*—Cushman, Darby & Cushman

[57] ABSTRACT

A method and an apparatus for affixing labels to a web of sheet or film material by means of a cylindrical labelling device having a label arranged peripherally thereon, said label being affixed to the web with a pure rolling motion and compressive action.

6 Claims, 3 Drawing Figures

Figure 1:
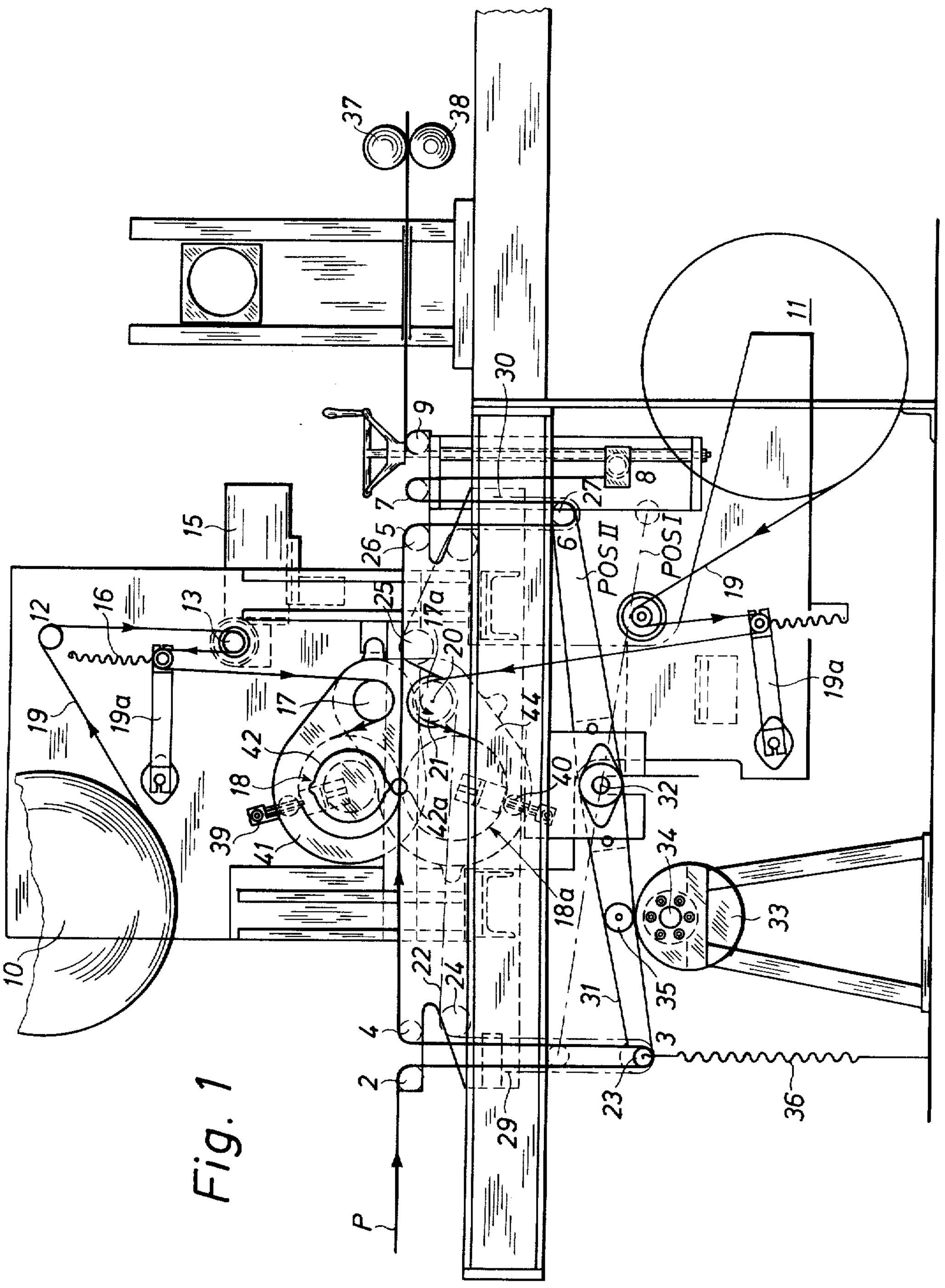

METHOD OF AFFIXING LABELS TO A WEB OF SHEET OR FILM MATERIAL AND APPARATUS FOR CARRYING OUT SAID METHOD

The present invention relates to a method and apparatus for affixing labels to a web of sheet or film material advanced past a labelling device in an operation comprising a feeding step in which the film web is advanced over a predetermined length equal to the distance between the centre of two affixed labels, and a labelling step in which a label is firmly affixed to the film.

The method and the apparatus according to the invention, for example, is suitable for affixing labels adapted to form reinforcements on both outer walls of carrybags around handles of the type formed by punching holes into the bag walls.

The present invention provides a method and apparatus permitting labels with clean-cut edges to be affixed at a considerably higher rate than heretofore possible and without the visible welding marks or stitches from needles caused by other methods, and also with fewer blisters and folds trapped between the bag wall and the label which is consequently firmly held in place. Furthermore, the invention provides an apparatus in which the size of the label may readily be changed within predetermined dimensions.

The method according to the invention is distinguished by the feature that each label is affixed to the film web by means of a cylindrical labelling device which during the labelling step is moved against the film web, urging subject to rotation a label arranged peripherally thereon against the film web to affix same with a pure rolling motion and compressive action, and by the labelling device during each feeding step being moved away from the film web to a neutral position out of contact with the web.

The labelling device may be formed as a vacuum cylinder with continuous openings provided in the cylindrical surface thereof for retaining the label during the movement towards the web by a vacuum action which is overcome by the adhesive power as the label is transferred to the web. In the labelling step the cylindrical device affixes the label at right angles to the web without any sliding motion between device and web, and this enables the label to be evenly rolled on thereto without the risk of an excessive number of blisters being formed below the label, which is provided with an adhesive on the side opposite the vacuum cylinder and facing the film web.

In one embodiment of the method according to the invention, the film web is caused both before and after the labelling device to describe a loop transversely of its travelling direction past the device, and the material of the loop in advance of the device is increased during the feeding step by a certain length, while the material of the loop following the device is reduced by the same length, and concurrently therewith the web following the last loop is advanced one step, corresponding to the distance between the label centres, after which the cylindrical labelling device, in the labelling step where it is urged against the film web, is caused to rotate at a surface speed equal to the moving rate of the film produced by the loop in the web in advance of the device again being reduced by the aforesaid length, and the loop following the device again being increased correspondingly.

The accumulation in this manner of a certain length of film web makes it possible both to advance the web over a uniform length in each feeding step and to cause the surface of the cylindrical labelling device and the film web to keep accurately in step with each other and in mutual contact during the labelling step.

In a second embodiment of the method according to the invention, the labelling device, during each feeding step, is moved over a distance along the plane of the film web in its neutral position, and during each labelling step, where the film web is at rest, it is moved back over the same distance, while affixing in its operative position a label to the web with a rolling motion.

This makes it possible to eliminate a number of movable means for controlling the rate of the film web during its movement past the labelling device, and to save some space. The labelling device is movable either over a distance longitudinally of the film web or transversely thereof.

The rate and dependability of the labelling operation may, according to the invention, be improved by the labels being introduced to the cylindrical labelling device as a continuous strip of labels, from the leading end of which the individual labels are cut off prior to each labelling step. By this method is eliminated the disadvantages of known methods where the labels are fed individually from a storage container or introduced on a supporting strip of paper which is wound up after having surrendered the labels. In these known methods the labels are required to pass through a number of operating steps before they are ready to be affixed. For example, the separate labels of a storage container should first be printed, punched, stacked and conveyed, and the container needs frequent replenishing, and also there is the risk of the labels sticking together when they are to be removed from the container, which involves loss of machine hours.

In affixing labels adapted to form reinforcements of bag handles or for similar purposes, the film web according to the invention may simultaneously be provided with labels on opposing sides, the latter being passed between two opposingly arranged cylindrical labelling devices, one of which, in the labelling step, being swung inwardly against the web.

The apparatus according to the invention for carrying out the method is distinguished by the feature that the labelling device is a pivotally mounted cylinder connected to drive means for feed rolls in such a manner that when the latter are operative in the feeding step, it is lifted and maintained clear of the film web in a neutral position, whereas when the feed rolls are at rest during the labelling step, it is held against the film web in an operative position in which it is able, while rotated, to move a label arranged on its periphery against the film web to affix same with a pure rolling motion and under pressure. In such an apparatus it is a relatively simple matter to synchronize the operation of the drive mechanism of the pivotally mounted and rotating labelling device with the feeding mechanism for the film web, and the apparatus applies the labels under a pressure at right angles to the film web, which, as mentioned above, affords the best possibilities of a tight-fitting relationship of the labels against the web with no wrinkles and blisters on the reverse.

One embodiment of the apparatus according to the invention is distinguished by the fact that the centre of a tilting lever is pivotally mounted about an axis perpendicular to the feeding direction of the web so as to be equally tiltable to both sides from a central position parallel to the feeding direction of the web, between a first position I, in which its end opposite the feeding direction has the least spacing from the web, and a second position II, in which the said end has the greatest spacing from the web, each end of said tilting lever supporting a pivotally mounted roll adapted in co-operation with guide rollers to loop the web transversely of the feeding direction, before and after the labelling device respectively, and that an actuating mechanism is connected to a drive mechanism for the feed rolls such that when the latter are in motion, the tilting lever will swing from said first to said second position, and where, the labelling device includes actuating means drivingly connected to the actuating mechanism of the tilting lever such that they will swing the labelling device from a neutral position to an operative position when from said second position II the tilting lever is moved back to said first position I, the labelling device being connected via a drive transmission to the tilting lever such that its surface at the point of contact is advanced at the same rate as the web upon moving the tilting lever from one position to the other.

The tilting lever makes it possible to accumulate the web material for advancing the material past the cylindrical labelling device and at the same surface speed as the latter in the labelling step. The tilting lever has the effect that the amount of film web released in the feeding step from the loop following the labelling device will correspond exactly to the length of web taken up in the loop in advance of the device, and the reverse will apply in the labelling step. The distance between the labels will solely depend on the forward pull of web by means of the feed rolls and entirely independent of the function of the tilting lever.

A second embodiment of the apparatus according to the invention is distinguished by the fact that the cylindrical labelling device is pivotally mounted on a sliding bracket connected to the drive means for the feed rolls so that when the latter are rotated, it is moved over a distance along the plane of the film web from a first position I to a second position II with the labelling device in its neutral position, while during the period when the feed rolls are at rest, it is moved back over the same distance with the labelling device in operative position, rolling on the film web at the same peripheral speed as the moving rate of the sliding bracket relatively to the film.

In such an apparatus it is a relatively easy matter to ensure that the labels are affixed with a pure rolling motion, and the film web is moved rectilinearly through the apparatus, which minimizes the risk of it becoming entangled to thereby cause operation stoppages.

The apparatus according to the invention could expediently be fed label material as a strip coated with an adhesive on the side opposite the labelling device, and from the leading end of which strip the individual labels are cut off before moved against the film web.

Figure 2:
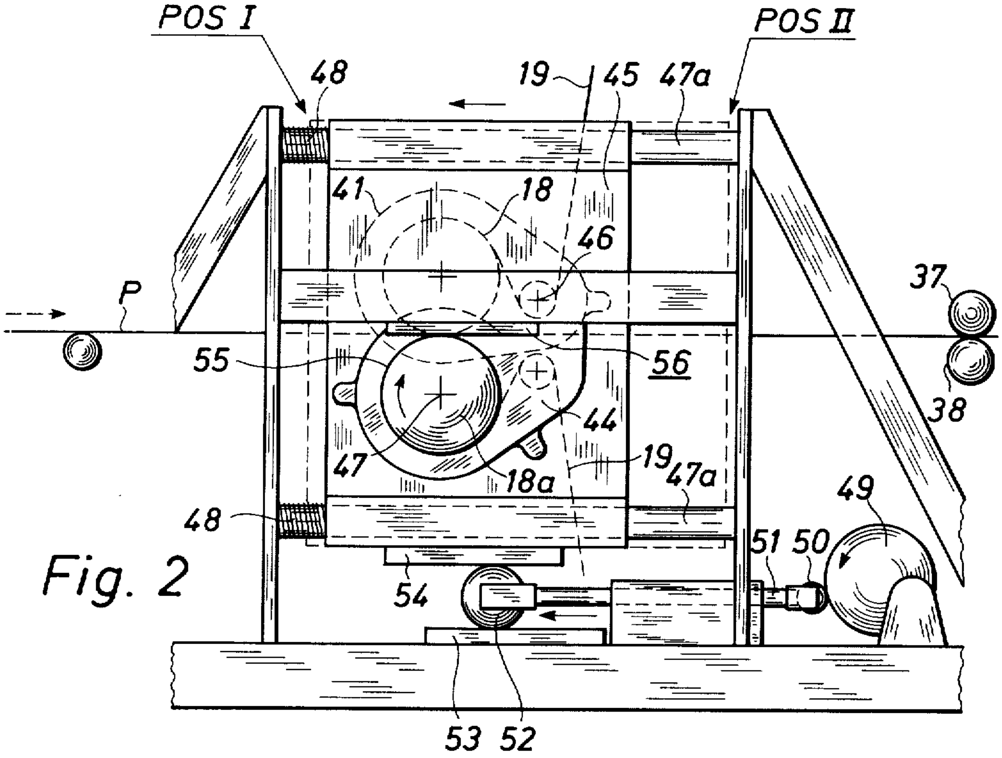
Figure 3:
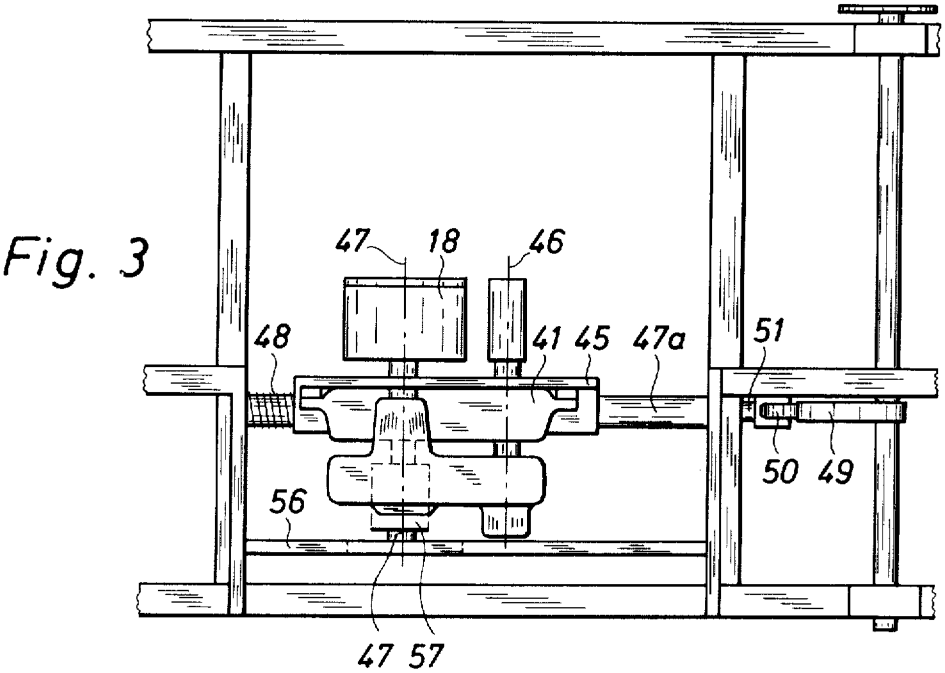

The invention will be further explained in the following with reference to the drawings, in which FIG. 1 is a schematic side view of one embodiment of the apparatus for affixing labels in the form of reinforcements to both outer side walls of plastic carrybags for the purpose of reinforcing handles formed by punching holes in the bag walls, and FIG. 2 and 3 represent a side, and top view, respectively, of a second embodiment of the apparatus according to the invention, also in schematic form.

FIG. 1 shows a web P of double film, divided into bag blanks by means of transverse welds, and which enters the apparatus from the left end thereof shown in the figure and is passed over a roller 2 having a fixed axis of rotation and around a roller 3 mounted at one end of a tilting lever 31 pivotal about its centre 32 and back over another roller 4 having a fixed axis of rotation, after which it is moved past a labelling device consisting of two vacuum cylinders 18 and 18*a* for simultaneously affixing labels to both sides of the bag blanks. From the said device the film web continues over a roller 5 having a fixed axis of rotation and over a roller 6 mounted at the other end of the tilting lever and back over yet another roller 7 having a fixed axis of rotation. After the roller 7 the web is passed downward around a roller 8, which is vertically adjustable, and continues over a roller 9 having a fixed axis of rotation to form a loop of adjustable size and further in between a pair of feed rolls 37 and 38 which by clamping the film during the first half of each cycle of operation, which forms a feeding step, advances same one step corresponding to the distance between the centres of the consecutive bags, or in other words, equal to the bag width. The vertical adjustment of the roller 8 is effected by means of a spindle provided with a handle, and this compensating unit serves to adjust the position of the bags between the labelling devices 18 and 18*a* during the second half of each cycle of operation in which the labels are affixed.

The tilting lever 31 is driven by an eccentric 33 mounted about an axis 34, on which eccentric a cam follower roll 35 is adapted to rotate, being mounted on the tilting lever and held against the periphery of the eccentric by the tensional force of a spring 36.

During the feeding step the feed rolls 37 and 38, driven by a crank mechanism, advances the web of material a distance equal to one bag width. The drive mechanism of the feed rolls are connected to the drive mechanism of the eccentric 33 such that the tilting lever is simultaneously moved from an indicated first position I to an indicated second position II, whereby the roller 3 moves downwardly and the loop formed over the rollers 2, 3 and 4 will take up a length of film corresponding to exactly the length of film released by the loop formed over the rollers 5, 6 and 7 being diminished as the roller 6 moves upwardly. During the feeding step of each cycle of operation the vacuum cylinders 18 and 18*a* are spaced from the film web P so as to allow the latter freely to pass between the cylinders.

During the second half of each cycle of operation, which forms a labelling step, the tilting lever 31 is moved from position II back to position I so as to release material from the loop formed over the rollers 2, 3 and 4, and film material is passed in between the vacuum cylinders 18 and 18*a* now swung inwardly against the lower and upper surfaces of the web at a rate equal to the surface speed of said cylinders as further explained in the following.

The labels or reinforcements to be applied to both side walls of each bag are fed from a supply bobbin 10 as a continuous tape 19 coated with an adhesive on one side thereof. The tape passes over an overun cam roller 12 and continues around a power-driven evenly rotated feed roll 13, and as the adhesive is on the side facing the feed roll, it contributes to establishing a power-transmitting connection between tape and feed roll. From the feed roll the tape continues around a "dancing" roller mounted on a swivel arm 19*a* biased by a spring 16 to produce a tensile stress with regard to the tape. Furthermore, this arrangement serves to accumulate the tape which is passed further down and around a gauge cylinder 17 before entering the vacuum cylinder 18. The swivel arm 19a of the "dancing" roller further serves as speed governor, being adapted in its extreme positions to adjust a potentiometer which determines the potential across a motor 15 driving the feed roll 13. From the opposite side of the web P, tape 19 is fed in similar manner from a supply bobbin 11 across a "dancing" roller 19a and a gauge cylinder 17a on to the vacuum cylinder 18a.

The vacuum cylinders are mounted in gearboxes 41 and 44 and driven together with the gauge cylinders 17 and 17a by means of gearwheels from an input shaft 20 such that one turn of the input shaft will cause the gauge cylinders to perform one full turn while the vacuum cylinders 18 and 18a are simultaneously rotated half a turn.

The input shaft 20 is driven through a one-way clutch and a chain wheel 21 concentrically mounted with respect to the shaft and in engagement with and driven by a chain 22 passed over chain wheels 23, 24, 25, 26 and 27, the ends of which chain are secured to the frame of the apparatus at points 29 and 30. The chain wheels 23 and 27, mounted at respective ends of the tilting lever 31, and the other chain wheels are so arranged that the chain will form loops following the loops in the film web P formed by the rollers 3 and 6 at the ends of the tilting lever. The one-way clutch is so arranged that the chain wheel 21 will bring with it the input shaft 20 when the tilting lever is moved from position II indicated by fully drawn lines to position I indicated by a dash line. This means that during the labelling step, in each cycle of operation the vacuum cylinders 18 and 18a are rotated half a turn and will each move a label 1 against the bag web P by a rolling motion and pressure at right angles to the web, the cylinders moving at the same rate as the latter. The gearbox 41 is pivotally mounted about the axes of the gauge cylinders, and a cam disc 42 co-operates with a cam follower roll 42a mounted in the gearbox 44 to produce the swinging movements of the labelling device.

In the feeding step the feed rolls 37 and 38 advance the material over a length equal to one bag width, there is released, as stated, a certain amount of bag material from the loop formed over the rollers 5, 6 and 7, and an amount of material having exactly the same length are taken up in the loop formed over the rollers 2, 3 and 4. At the same time, the chain 22 performs the same movement as the bag material, it being likewise controlled by the motions of the tilting lever 31. This means that the chain will have rotated the chain wheel 21 on the input shaft 20, but the one-way clutch is arranged so as to be free-wheeling when the chain wheel 21 shown in the drawing is rotated clockwise, and therefore the input shaft 20 has not moved. Thus, the labelling devices 18 and 18a are standing still during the feeding step of each cycle, and in this position the leading end of each label tape 19 is cut off by means of a cutter mechanism 39 and 40, respectively, in which a slidable knife is actuated for severing the tape, it being operated, for example, from an air cylinder actuated by a magnetic value and a microswitch which is closed after each half turn of the vacuum cylinder. As stated, the labelling devices 18 and 18a, in this position, are out of contact with each other and the intermediate film material so as to allow the latter freely to move through the clamping area between the cylinders during the feeding operation by means of the feed rolls 37 and 38.

During the labelling step in each cycle of operation the feed rolls 37 and 38 are at rest, and the tilting lever 31 moves from position II back to position I driven by the eccentric 33, whereby equal amounts of chain and bag material are released from the loop formed over the rollers 2, 3 and 4, while an equal amount of chain and bag material is taken up in the loop formed over the rollers 5, 6 and 7, i.e., the bag material and the chain are moved at exactly the same linear rate. During this movement the chain drives the input shaft 20 through the chain wheels 21 and the one-way clutch, and as half the circumference of the labelling device equals the length of the amount of bag material passed between the clamping area of the labelling cylinders, the rate of the bag material will at any time equal the surface speed of the labelling devices such that the reinforcements are rolled on to the bag walls subject to a compressive action at right angles thereto.

The non-adhesive side of the tape fed engages the surface 18 and 18a of the labelling devices, being kept smooth by the higher surface speed of the labelling devices in relation to the gauge cylinders 17 and 17a, being retained by the vacuum through perforations provided in the cylinder surfaces sucking and holding the tape thereto until the cut-off labels or reinforcements are urged with their adhesive side against the bag material. Owing to the higher surface speed of the labelling device, each label cut off is removed a distance from the tape.

In the apparatus shown in FIGS. 2 and 3, a web P of double film, divided into bag blanks prior to or following the labelling operation by means of transverse welds, is advanced stepwise through the apparatus over a rectiliniar path by means of the feed rolls 37 and 38 in the direction indicated by the arrow, i.e., from left to right in the figure. The film web is passed under the cylindrical labelling device 18, and the example shown includes another labelling device 18a provided thereunder and adapted to affix labels to the lower surface of the film, serving at the same time as a counterpressure roll.

The labelling devices are adapted to hold a label along their periphery and move it against the film web, where the force holding it to the cylinder is relieved and the label affixed by a pressure exercised at right angles to the web by the labelling device rolling thereon. In this manner the labels are smoothly applied with the least possible number of blisters between label and film and without wrinkles. The labels may, for instance, be held to the periphery of the device by means of vacuum which is relieved after moving the label down to the film web. The labels may, if desired, be fed as a tape 19, from which the individually labels are gradually cut off by means of cutter mechanisms, as discussed above in connection with the apparatus of FIG. 1. The labels may be coated with an adhesive actuated by pressure, or an adhesive coat may be applied in conventional manner to the side of the label opposite the labelling device immediately prior to its affixture.

The labelling device 18 is mounted in the gear box 41 which is pivotally mounted on a sliding bracket 45, it being capable of pivoting about an axis 46 from a neutral position in which it is lifted above the film web P to the operative position shown in FIG. 1 where the labelling device is urged against the film web. The labelling device 18*a* is mounted about a fixed axis 47 on the sliding bracket. The swinging movement of the gearbox 41 and the labelling device 18 is possible by means of a not shown cam disc connected to drive means for the feed rolls 37 and 38 in such a manner that the device 18 remains in its raised neutral position when the feed rolls are rotating to advance the film one step, whereas the labelling device is moved down into its operative position against the film when the feed rolls are at rest.

The sliding bracket 45 slides on two cylindrical guides 47*a*, one end of which is surrounded by a coil spring 48, and said springs are capable of moving the sliding bracket from the position I indicated to the left in the drawing by a dash line to the position II indicated to the right in drawing by a dash line when the sliding bracket is not subject to opposing forces. This movement takes place when the labelling device 18 is raised to its neutral position and while the feed rolls 37 and 38 advance the film web P a distance. Movement in the opposite direction is produced by means of an eccentric 49 connected to the drive means of the feed rolls and mounted such that when the rolls are at rest, its periphery is allowed to apply a pressure to a cam follower roll 50 which is mounted at one end of a push rod 51 so as to move said rod to the left in the figure. At the opposite end of the rod is mounted a gearwheel 52, the lower portion of which runs on a stationary toothed bar 53, and the upper portion of which is in engagement with a toothed bar 54 secured to the sliding bracket 45. In this manner the sliding bracket 45 is displaced to the left in the figure, and during this movement a gearwheel 55 is running on a stationary toothed bar 56. By means of a one-way clutch 57 the gearwheel 55 is connected to the shaft 47 on which the labelling device 18*a* is secured, having the same diameter as this.

As the gearwheel drives the shaft upon rotating in the direction indicated by the arrow (clockwise), the labelling device 18*a* will be rolling on the film web at a peripheral speed equal to the speed of the sliding bracket, to thereby affix a label with a purely rolling motion. This also applies to the labelling device 18 which through a transmission means is drivingly connected to the labelling device 18*a* such that they rotate at the same speed in opposite directions. The said transmission means includes a gearwheel rotatably mounted about the pivot axis 46 of the gearbox 41. As the feed rolls 37 and 38 are at rest during this movement of the sliding bracket 45 to the left in the figure, the device 18 is moved down to its operative position, as shown in the drawing. During the rolling motion a label is transferred, as explained above, from each device to their respective sides of the film web P.

After having moved the sliding bracket to position I of the eccentric 49 on the push rod 51, the springs 48 will again be able to move it to the right in the figure after the labelling device having been raised to its neutral position. This causes the gearwheel 55 to rotate in the opposite direction but without bringing with it the labelling device 18*a* as the connection thereto is disengaged by the one-way clutch 57.

It will be appreciated that the apparatus may also be so designed that the sliding bracket and the labelling devices will perform a movement transversely of the travelling direction of the film web P, as in that case the web could also be advanced between the devices when the upper one thereof is swung upwards to a neutral position, and the labelling devices are allowed to roll transversely fo the film web in their operative position when the film is at rest.

I claim:

1. A method of affixing labels to a web of sheet or film material comprising the steps of:
  - stepwise advancing a film web into and out of said apparatus,
  - moving said advanced film web in synchronism with a label being affixed thereto by pivoting a tilting lever mounted to said apparatus, said tilting lever having rollers at each end thereof about which said film web is positioned,
  - feeding a web of labels to a vacuum roller,
  - attracting said labels to the surface of said vacuum roller,
  - cutting each label from the web of labels after each label is attracted to the surface of said vacuum roller, and
  - rotating said vacuum roller by said tilting lever slightly faster than the rate at which said web of labels is fed thereto to thereby separate the cut label from said web of labels, and
  - moving said vacuum roller against said film web and urging while rotating a label arranged peripherally thereon against said film web to affix the label to the film web with a pure rolling motion and compressive action.

2. The method of claim 1 further comprising the steps of feeding the labels in the web of labels to said vacuum roller via a gauge cylinder, rotating the gauge cylinder to predetermined arc length to thereby feed a predetermined length of the web of labels to said vacuum roller, disengaging the vacuum roller from the web to move said vacuum roller to a neutral position when said tilting lever is in a first position, and severing the label from the web of labels when in said disengaged position.

3. The method according to claim 1 further comprising the step of simultaneously applying labels to opposite sides of said film web by means of two opposingly arranged vacuum rollers.

4. An apparatus for affixing labels to a web of sheet or film material comprising means for step-wise advancing a film web into and out of said apparatus, a tilting lever pivotally mounted to said apparatus, said tilting lever having rollers at each end thereof about which said film web is positioned for moving said film web in synchronism with a label being affixed thereto, a gauge roller means for intermittently feeding a web of labels, said gauge roller means being driven by said tilting lever, a vacuum roller means receiving the web of labels from said gauge roller means for applying said labels to said film web, means for cutting each label from the web of labels after a label is attracted to the surface of said vacuum roller, said vacuum roller being driven by said tilting lever at a slightly faster rate than said gauge roller to thereby separate said cut label from said web of labels, and means for moving the vacuum roller against the film web and urging while rotating a label arranged peripherally thereon against the film web to affix the label to the film web with a pure rolling motion and compressive action, said advancing means including means independent of said tilting lever for varying the deistance between said labels affixed to said web.

5. The apparatus of claim 4 further comprising an adjusting unit for adjusting the longitudinal position of the film web in relation to said vacuum roller means, said adjusting unit comprising guide rollers mounted about fixed axes and a guide roller arranged with adjustable spacing about the line through the center of said guide rollers and over which the web is passed to form a compensating loop of adjustable size.

6. The apparatus of claim 4 further comprising a gauge roller means and a vacuum roller means positioned on the underside of said film web for applying labels to both sides of said film web.

* * * * *